(No Model.)  5 Sheets—Sheet 1.
F. R. BACON.
UPHOLSTERING DEVICE.
No. 592,270. Patented Oct. 26, 1897.
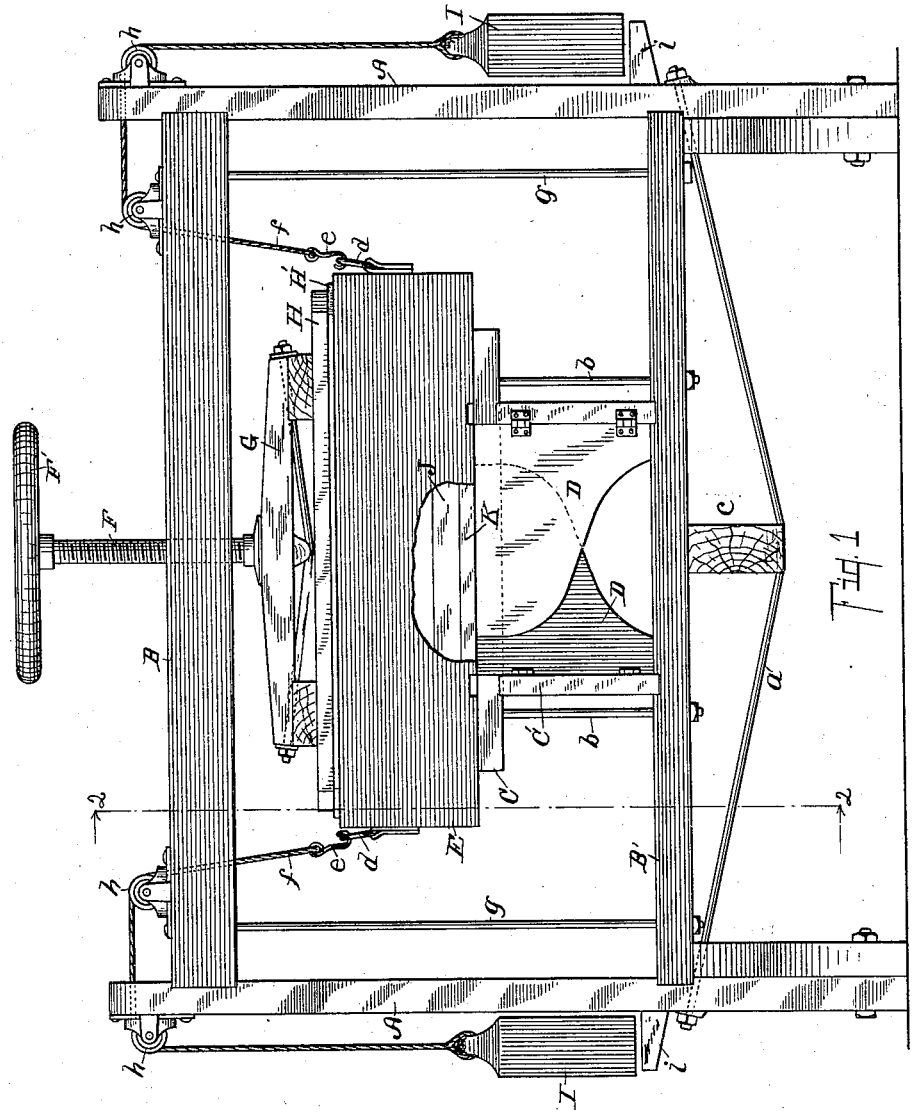
Witnesses:
W. S. Wood
V. E. Chappell
Inventor,
Frank R. Bacon
By Fred L. Chappell
Att'y.

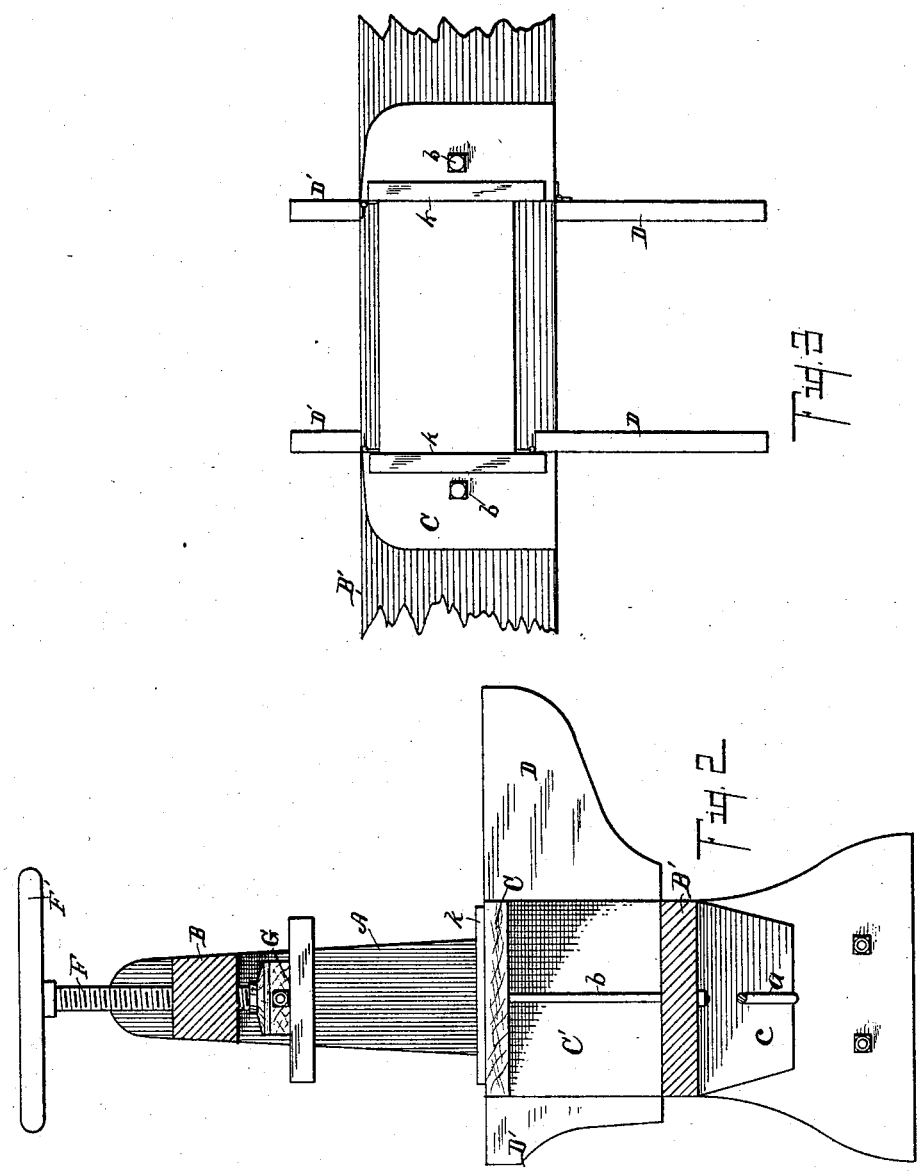

(No Model.) 5 Sheets—Sheet 3.
F. R. BACON.
UPHOLSTERING DEVICE.

No. 592,270. Patented Oct. 26, 1897.

Witnesses:
H. S. Wood
U. E. Chappell

Inventor,
Frank R. Bacon
By Fred L. Chappell
Att'y.

(No Model.) 5 Sheets—Sheet 4.
F. R. BACON.
UPHOLSTERING DEVICE.
No. 592,270. Patented Oct. 26, 1897.
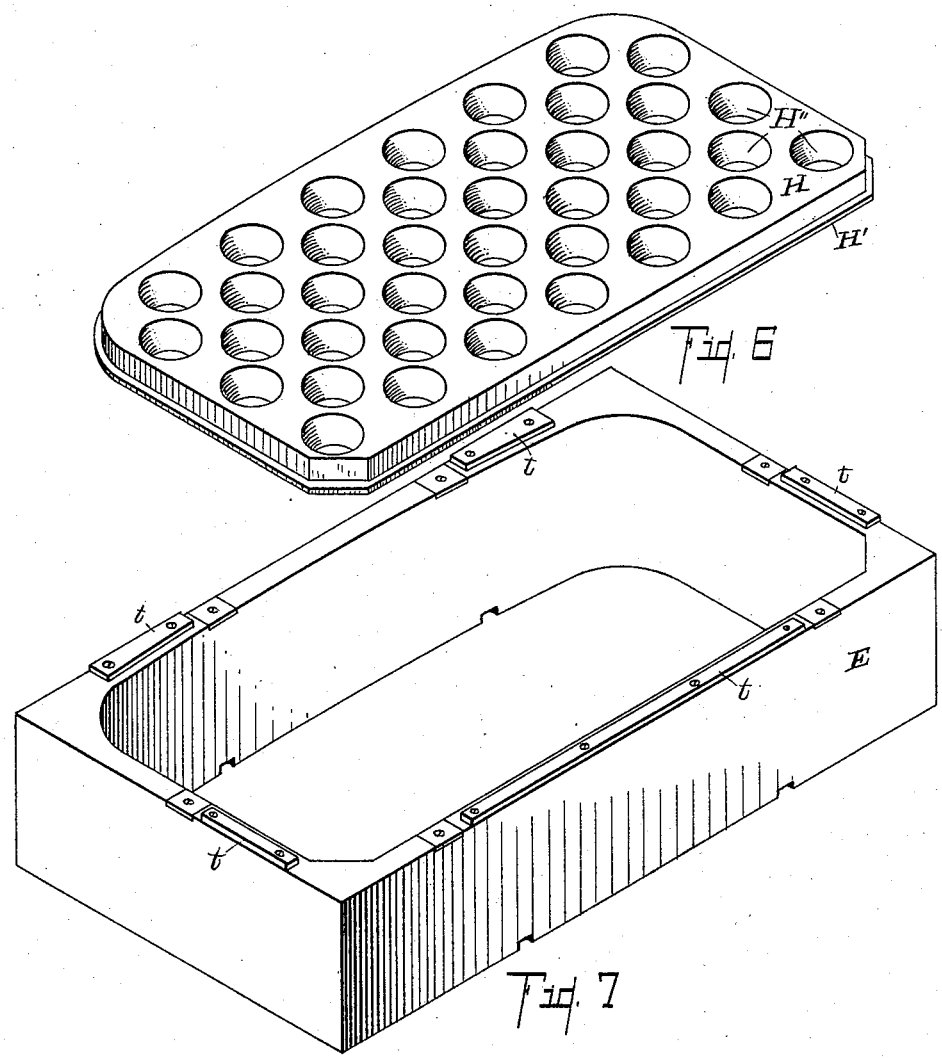
Witnesses:
W. S. Wood
U. E. Chappell
Inventor,
Frank R. Bacon
By Fred L. Chappell
Att'y.

(No Model.) 5 Sheets—Sheet 5.

F. R. BACON.
UPHOLSTERING DEVICE.

No. 592,270. Patented Oct. 26, 1897.

Witnesses:
W. S. Wood
J. E. Chappell

Inventor,
Frank R. Bacon
By Fred L. Chappell
Att'y.

UNITED STATES PATENT OFFICE.

FRANK R. BACON, OF KALAMAZOO, MICHIGAN, ASSIGNOR TO THE MICHIGAN BUGGY COMPANY, OF SAME PLACE.

UPHOLSTERING DEVICE.

SPECIFICATION forming part of Letters Patent No. 592,270, dated October 26, 1897.

Application filed October 12, 1895. Serial No. 565,466. (No model.)

*To all whom it may concern:*

Be it known that I, FRANK R. BACON, a citizen of the United States, residing at the city of Kalamazoo, in the county of Kalamazoo and State of Michigan, have invented a certain new and useful Upholstering Device, of which the following is a specification.

My invention relates to improvements in upholstering devices, and especially to upholstering devices or machines for forming carriage-seat cushions, carriage-seat backs, and similar cushions, and relates in part to improvements on United States Patent No. 511,649, issued December 26, 1893, to Henry B. Pitner.

The objects of my invention are, first, to provide a machine so constructed that a single operative can operate it successfully; second, to provide improved means of locating and fixing the cloth, leather, or other fabric which forms the cover of the cushion to form the sections or biscuits; third, to provide a construction in which the various parts of the machine are supported properly and securely on forms in such a manner that a large number of operations can be performed at one and the same time for shortening the time required in the manufacture; fourth, to provide improved means of inserting and locating the buttons in said cushions; fifth, to provide an improved press and accompanying apparatus for use in such devices, and other objects appearing in the detailed description. I accomplish these objects of my invention by the devices and means shown in the accompanying drawings, in which—

Figure 4:
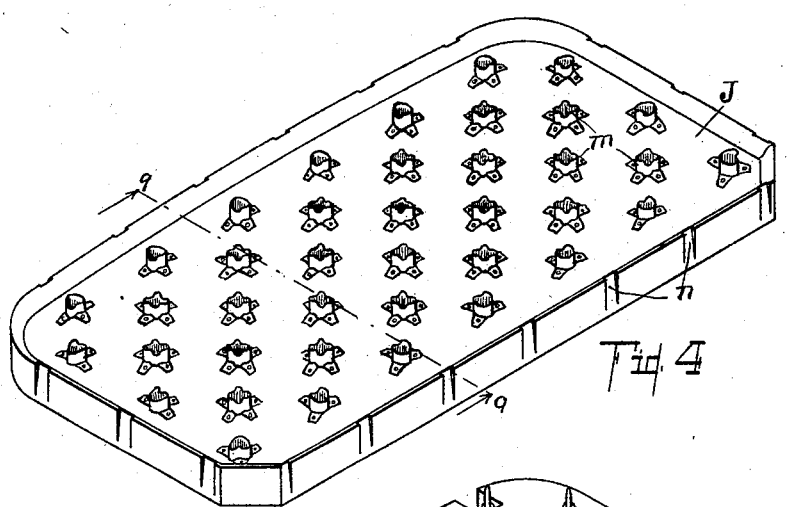
Figure 5:
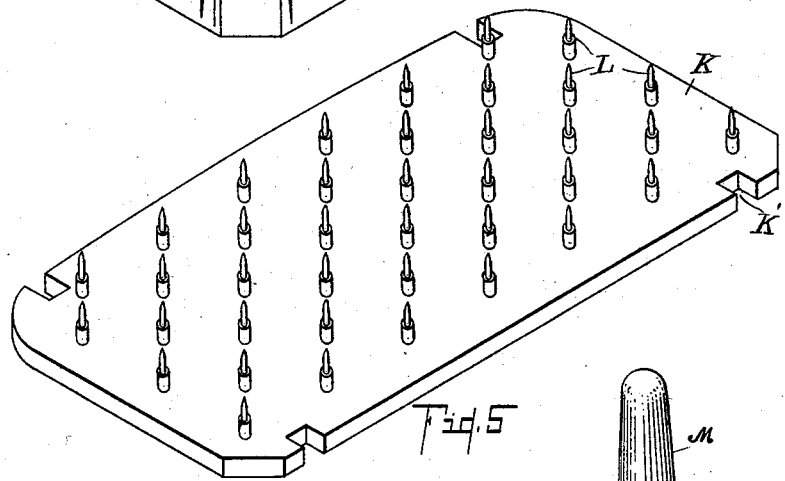
Figure 13:
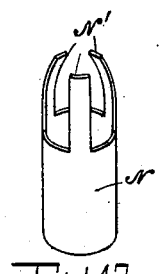
Figure 12:
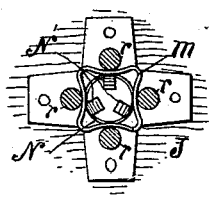
Figure 11:
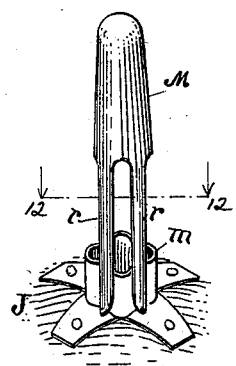
Figure 8:
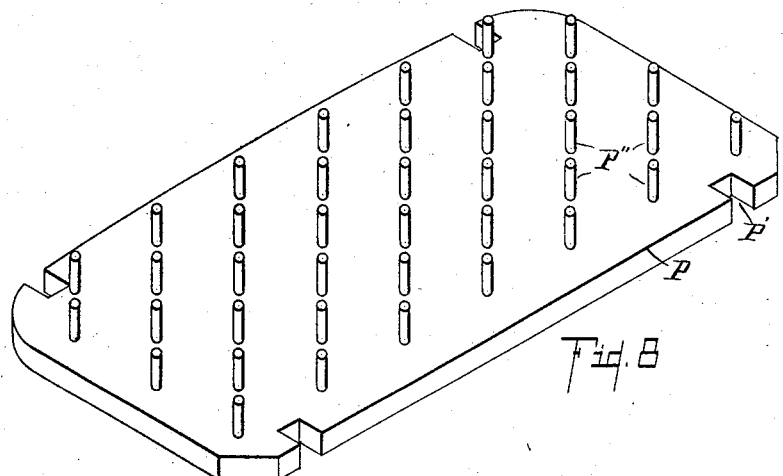
Figure 9:
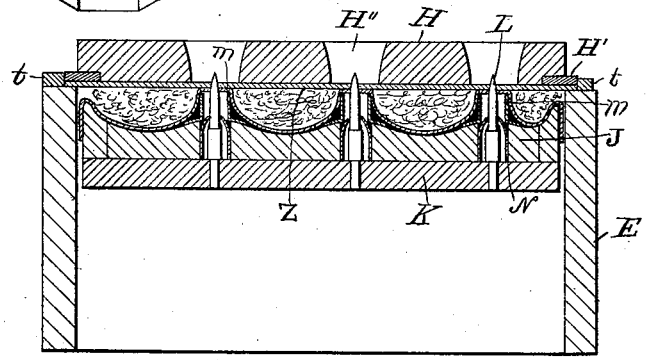
Figure 10:
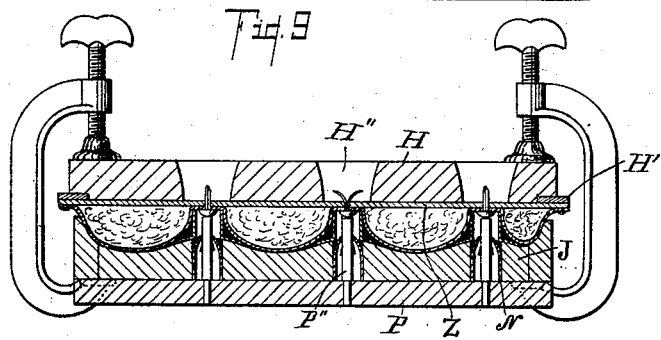

Figure 1 is a front elevation of the main portion of my machine, a part of the guiding-casing being broken away to show some of the forms therein. Fig. 2 is a sectional view on line 2 2 of Fig. 1, looking in the direction of the little arrows at the end of the section-line, the casing E being omitted. Fig. 3 is a detail top plan view of the central form-supporting portion of the main frame. Fig. 4 is a form for conforming the top of the cushion, bearing upwardly-projecting irregular tubes *m*, for the insertion of the buttons. Fig. 5 is a perspective view of a form with perforating-pins thereon. Fig. 6 is the female form, corresponding to the form in Figs. 4, 5, &c., to be placed on the back of the cushion. Fig. 7 is a perspective view of the casing in which the forms are guided. Fig. 8 is a form for supporting pegs against the buttons to hold them in place while they are being clenched at the back and to drive them to position. Fig. 9 is a sectional view through the forms in operation on a line corresponding to 9 9 of Fig. 4. Fig. 10 is a sectional view similar to that in Fig. 9, showing the parts clamped together for the purpose of clenching the buttons, fastening the edge of the cushion, and trimming and finishing the same. Fig. 11 is an enlarged detail perspective view of one of the clothes-pins or instruments for holding the fabric or covering on the form J. Fig. 12 is a sectional view on line 12 12 of Fig. 11, looking down. Fig. 13 is an enlarged detail perspective view of one of the inner tubes and springs for securing and guiding the buttons properly in place within the irregular tubes.

Similar letters of reference refer to similar parts throughout the several views.

Referring to the lettered parts of the drawings, A A represent the main end standards to my machine.

B is a heavy cross-beam connecting the tops together.

B' is a lower cross-beam supported inside the main standards on suitable block-supports. A truss-rod *a* passes under the strut *c* on the under side of the beam B'. Rods *g* securely connect the upper and lower beams together at each end. At each side of the beam B' are upwardly-projecting plank-supports C'. Across the top of these supports C' extends a plank C, having a general outline of the cushion to be formed. A casing E encircles the plank C and is adapted to pass up and down over the same. Within the casing E the forms are placed upon the machine, as hereinafter will be described. Suitable weights I are at each end of the machine and are connected to counterbalance the casing E by the cords *f*, passing over the pulleys *h h* toward each end. The cords *f* are detachably attached to the casing E by the hooks *e* in the rings *d* on the ends of the casing E. Suitable shelves *i* at each end of the machine form stop-supports for the weights I, which prevent the raising of the casing too high. Through the top beam B extends a large screw F, operated by the hand-wheel F'. On the lower end of this screw is a cross-head G, which is adapted to press the forms hereinafter described together by pressing them against the plank-plate C, the forms being suitably guided by the casing E. The casing E is suitably guided to place by the guides k k on the top of the plank C. Wings D D and D' D' are hinged to each side of the plank-supports C' and are adapted to fold to a position parallel with the sides of the plank-plate C, the upper edges of the wings being on a level with the plank-plate C. These wings serve as strong positive supports for the casing E when it is in its elevated position, and they can be folded together to allow the casing to pass down over the plank-plate C.

J represents a suitable form for forming the exterior of the cushion and for locating the cover of the same. Irregular tubes m, also called "tucking devices," project upwardly therefrom to locate each button in the cushion and to form the divisions of the cushion. The form itself is suitably rounded between the tubes m to shape the sections of cushions. Around the exterior of the forms J are suitable notches n to accommodate the folding of the material of the cushion-cover between the sections or biscuits. Within each tube m is an auxiliary tube N, having three inwardly-curved spring portions N', which project well up toward the tops of the tubes m. These are, in general terms, the supports and guides for the buttons or nails of the cushion.

Plate K, corresponding in size to the form J, bears suitable upwardly-projecting sharp-pointed steel pins L, located thereon in the same relative position as the irregular tubes m on form J. Notches K' are cut into the form K to permit a clamping of the forms beyond it, so that the form K can be removed. The pins L are adapted to project upwardly through the tubes m for the purposes which will hereinafter be explained. For each irregular tube m there is a sort of multiple clothes-pin or instrument M, having prongs r adapted to engage in the irregular notches of the tubes m for clamping the cloth of the cushions in place, as will be readily seen in Figs. 11 and 12. The instruments themselves are shown in position without the cloth in the figures. A form P with notches P' to correspond to the notches K' in form K and for the same purpose bears upwardly-projecting pegs P", which in general terms are nail-followers for forcing the buttons or nails of the cushion to position and holding them to the back of the cushion where they can be clenched. A form H contains apertures H", corresponding to the tubes m and pins L and pegs P". Around the outer edge of this form H is a steel or iron rim H' for clenching the tacks, which are used to bind the outer edge of the cushion.

Having thus enumerated all of the parts of my improved upholstering device or machine, I will point out their uses and operation. To construct a cushion, form J is placed upon form K so that the points of the pins L project upwardly through the irregular tubes m. The cushion-cover, whether of leather, cloth, or other fabric, is first perforated wherever a button should be located upon it, and it is then placed over the form J, the perforation being placed over the sharp points of the pins L to locate them. The fabric is then secured in place by the clothes-pins or instruments M grasping the cushion-cover tight against the irregular tubes m. This puckers the cushion-cover at the right points for forming the sections or biscuits of the cushion. The covering is folded over the edge of the form J, the folds or plates coming in the notches n n around the outside of the same. The two forms together are then placed upon the plate C of the press, as indicated in Fig. 1, and the padding, consisting of curled hair, or waste cotton, or other material, is placed upon the cushion-covering between the upwardly-projecting pins M and is evenly distributed over the same to form a cushion of the thickness desired. When this is done, the pins M are removed and the cushion-back Z is laid upon the top of the casing E, it fitting between the guide-stops t t t on the top side of the same which locate it. When this is done, the form H is placed upon the back of the cushion Z and the cross-head G turned down upon it. The wings D D and D' D' are folded together to allow the casing E to pass downward. The weights I hold the casing E upwardly against the form H, and the screw F is turned down and compresses the form H onto the cushion and padding until the back is closed against the ends of the irregular tubes m. This forces the points of the pins L through the back of the cushion Z, forming holes for the insertion of the buttons. The weights I are then detached from the casing E, and it is allowed to drop down and rest upon the beam B', and suitable hand-clamps are then placed upon the forms J and H to clamp them together, the noses of the clamps being put in the notches K' of the form K to allow it to be removed. The forms H and J being clamped together are then removed to a suitable table or bench, where the edges of the cushion are tacked down, the tacks clenching on the rim H'. After the edge of the cushion is secured the usual clench-buttons are inserted into the irregular tubes m from the outside, the springs N' within the same centering the buttons, causing the points thereof to pass through the perforations in the backs of the cushions and pass securely to place. The buttons are crowded to place by placing the form P, with the pegs P" thereon, to the top of the cushion and crowding it (the cushion) down, which forces the pegs P" to the position indicated in Fig. 10. In this position the buttons are clenched, the forms J and H are unclamped, and the cushion is completed.

The forms with pins, tubes, and pegs thereon, as I have shown, can be used independently of the press, although the press is especially adapted for use in connection with the same and accomplishes its purpose perfectly, and this special press could be used in connection with the forms described and shown in the patent to Pitner above referred to.

Having thus described my invention, what I desire to secure by Letters Patent is—

1. In an upholstering-machine a combination of the frame composed of the uprights A, A, and the cross-beams B, B', connected together by bolts $g$, plate C, supported on suitable supports C', on beam B'; wings D, D, D', D', hinged to said supports C', and adapted to operate on a level with the top of said plate C; casing E, adapted to move up and down over the plate C and wings D, D, D', D'; weights I, I, to each end of said frame; cords $f$, to pass over suitable pulleys and connected to said weights and detachably attached to the casing E, by hooks $e$, in rings $d$, a screw $f$, through the top beam B, operated by hand-wheel F; cross-head G, on the lower end of said screw; and suitable forms for inserting in said casing to be pressed between the cross-head G, and the plate C, all substantially as described for the purpose specified.

2. In an upholstering-machine the combination of a suitable press-frame; upwardly-projecting supports C', with the plate C, across the top thereof; the casing E, adapted to move up and down over said plate; wings D, D, and D', D', hinged to said supports and adapted to swing outwardly to support the movable casing; counterbalance-weights attached to said casing to raise the same normally against the upper press-plate; and suitable forms for insertion in said casing; press-plate, or form, H, and suitable means for actuating the same; for the purpose specified.

3. In an upholstering-machine the combination of a suitable press-frame; upwardly-projecting supports C', with the plate C, across the top thereof; press-plate, or form, H, above with means of operating the same; the casing E, adapted to move up and down over said plate; counterbalance-weights attached to said casing to raise the same normally against the upper press-plate; and suitable forms for insertion in said casing for the purpose specified.

4. In an upholstering-machine the combination of a suitable press-frame; upwardly-projecting supports C', with the plate C, across the top thereof; a press-plate or form, H, above with means for operating the same; the casing E, adapted to move up and down over said plate C; wings D, D, and D', D', hinged to said supports and adapted to swing outwardly to support the movable casing; and suitable forms for insertion in said casing for the purpose specified.

5. In an upholstering device the combination of the form J, with upwardly-projecting irregular tubes $m$ thereon central tubes N, with inwardly-curved springs N', within each tube $m$; a form K, with upwardly-projecting sharp-pointed steel pins L, corresponding to the irregular tubes $m$, on the form J, and adapted to project through the same for locating the cover of the cushion properly on the form J; suitable clothes-pins or instruments M, for retaining the cloth securely on the irregular tubes $m$, a casing E, adapted to slip over the forms J, and K, and project above the same; a form H, with metal rim H', around the same containing apertures H'', corresponding to the irregular tubes $m$, on the form J, adapted to be placed over the back of the cushion; and a suitable press for compressing the forms J, K, and H, together (after the cushion material has been placed upon the cover and the pins M, removed) to puncture the back for receiving the buttons and to afford the opportunity for securing the edge of the cushion; and a suitable form P, with pegs P'', thereon for forcing the buttons through the tube $m$, and through the back of the cushion all coacting together for the purpose specified.

6. In an upholstering device of the class described the combination of the form J, with upwardly-projecting tubes thereon; a form K, with upwardly-projecting sharp-pointed steel pins L, to project upwardly through the tubes on the form J, to locate the cushion-cover securely in place; suitable means of fastening the cover to the upwardly-projecting tubes; and a press to compress the front and back of the cushion together after the cushioning material has been inserted and to force the sharp points of the pins through the backs for the purpose of attaching the buttons and locating them positively in place for the purpose specified.

7. In an upholstering device of the class described the combination of a form J; with upwardly-projecting tubes thereon for the formation of the cushion; inwardly-curved springs N', supported within said tubes as a guide for the buttons; the form P, with the pegs P'', thereon for crowding said buttons to position simultaneously for clenching the buttons for the purpose specified.

8. In an upholstering device of the class described the combination of the form J, with upwardly-projecting tubes thereon for the formation of the cushion; and inwardly-curved springs N', within said tubes to guide the buttons to place for the purpose specified.

9. In an upholstering device of the class described, the combination of the form, J, with upwardly-projecting tubes thereon; and a form, K, with upwardly-projecting, sharp-pointed pins, L, to project upwardly through the tubes on the form, J, to locate the cushion-cover securely and regularly in place for the purpose specified.

10. In an upholstering device the combination of a bottom having projecting hollow tucking devices, a correspondingly-perforated top, a nail-support having nail-followers, and means whereby the nails are supported in their proper position on said followers when they are simultaneously forced up through the bottom and tucking devices substantially as set forth.

11. In an upholstering device, the combination of a bottom having projecting hollow tucking devices, a correspondingly-perforated top, nail-supports having nail-followers, and guides whereby the nails are held against displacement while being forced simultaneously up through the bottom and tucking devices substantially as set forth.

In witness whereof I have hereunto set my hand and seal in the presence of two witnesses.

FRANK R. BACON. [L. S.]

Witnesses:
M. HENRY LANE,
W. F. COWLBECK.